(12) United States Patent
Zhang et al.

(10) Patent No.: US 9,980,162 B2
(45) Date of Patent: May 22, 2018

(54) ENHANCED RADIO RESOURCE MANAGEMENT MEASUREMENT MECHANISM IN LOCAL AREA NETWORK WITH FLEXIBLE TIME DIVISION DUPLEX

(71) Applicant: Avago Technologies General IP (Singapore) Pte. Ltd., Singapore (SG)

(72) Inventors: Lili Zhang, Beijing (CN); Jing Han, Beijing (CN); Chunyan Gao, Beijing (CN); Haiming Wang, Beijing (CN); Wei Hong, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 169 days.

(21) Appl. No.: 14/782,181

(22) PCT Filed: Apr. 3, 2013

(86) PCT No.: PCT/CN2013/073751
§ 371 (c)(1),
(2) Date: Oct. 2, 2015

(87) PCT Pub. No.: WO2014/161195
PCT Pub. Date: Oct. 9, 2014

(65) Prior Publication Data
US 2016/0057642 A1   Feb. 25, 2016

(51) Int. Cl.
*H04W 24/08* (2009.01)
*H04W 24/00* (2009.01)
(Continued)

(52) U.S. Cl.
CPC .......... *H04W 24/08* (2013.01); *H04L 5/1469* (2013.01); *H04W 24/00* (2013.01); *H04W 36/0094* (2013.01); *H04W 72/00* (2013.01)

(58) Field of Classification Search
CPC . H04W 24/08; H04W 72/00; H04W 36/0094; H04W 24/00; H04L 5/1469
See application file for complete search history.

(56) References Cited

U.S. PATENT DOCUMENTS

| | | | |
|---|---|---|---|
| 2009/0180435 A1* | 7/2009 | Sarkar | H04L 5/14 370/330 |
| 2010/0027491 A1 | 2/2010 | Reina et al. | |

(Continued)

FOREIGN PATENT DOCUMENTS

| | | |
|---|---|---|
| CN | 102340383 | 2/2012 |
| CN | 102594527 | 7/2012 |

OTHER PUBLICATIONS

International Search Report for PCT/CN2013/073751 dated Jan. 9, 2014.
(Continued)

*Primary Examiner* — Tejis Daya
(74) *Attorney, Agent, or Firm* — Foley & Lardner, LLP

(57) ABSTRACT

The present invention addresses a method, apparatus and computer program product for enabling enhanced repetition radio resource management measurement mechanism in local area network with flexible time division duplex. For initiating a radio resource management measurement accomplished by a user equipment of a host cell and approaching a neighboring cell, the base station of the host cell transmits information indicating a radio resource management measurement subband and a cross link measurement subframe to the user equipment and not performing an uplink transmission, wherein the radio resource management measurement subband is an uplink prohibited subband that is being used in a downlink transmission of the neighboring cell, and the cross link measurement subframe is a subframe capable of being used for completing an uplink to downlink switch.

20 Claims, 5 Drawing Sheets causing transmission, in a host cell, of information indicating a radio resource management measurement subband and a cross link measurement subframe to a user equipment approaching a neighboring cell and not performing an uplink transmission, for initiating a radio resource management measurement accomplished by the user equipment, wherein the radio resource management measurement subband is an uplink prohibited subband that is being used in a downlink transmission of the neighboring cell, and the cross link measurement subframe is a subframe capable of being used for completing an uplink to downlink switch.

S11

(51) Int. Cl.
H04W 36/00 (2009.01)
H04L 5/14 (2006.01)
H04W 72/00 (2009.01)

(56) References Cited

U.S. PATENT DOCUMENTS

| | | | | |
|---|---|---|---|---|
| 2010/0296410 | A1* | 11/2010 | Kazmi | H04W 24/10 370/252 |
| 2011/0188481 | A1* | 8/2011 | Damnjanovic | H04W 72/04 370/336 |
| 2012/0087266 | A1 | 4/2012 | Vajapeyam et al. | |
| 2012/0113961 | A1* | 5/2012 | Krishnamurthy | H04L 1/0026 370/332 |
| 2013/0040640 | A1* | 2/2013 | Chen | H04W 36/30 455/434 |
| 2013/0196603 | A1* | 8/2013 | Gheorghiu | H04W 24/00 455/67.11 |
| 2014/0321313 | A1* | 10/2014 | Seo | H04J 11/00 370/252 |
| 2015/0237518 | A1* | 8/2015 | Seo | H04W 24/10 455/452.1 |
| 2015/0289144 | A1* | 10/2015 | Yi | H04W 36/22 370/252 |

OTHER PUBLICATIONS

Written Opinion of the Searching Authority for PCT/CN2013/073751 dated Jan. 9, 2014.
International Preliminary Report on Patentability for PCT/CN2013/073751 dated Oct. 6, 2015.

* cited by examiner

Fig. 1 causing transmission, in a host cell, of information indicating a radio resource management measurement subband and a cross link measurement subframe to a user equipment approaching a neighboring cell and not performing an uplink transmission, for initiating a radio resource management measurement accomplished by the user equipment, wherein the radio resource management measurement subband is an uplink prohibited subband that is being used in a downlink transmission of the neighboring cell, and the cross link measurement subframe is a subframe capable of being used for completing an uplink to downlink switch. — S11

Fig. 5

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |

ENHANCED RADIO RESOURCE MANAGEMENT MEASUREMENT MECHANISM IN LOCAL AREA NETWORK WITH FLEXIBLE TIME DIVISION DUPLEX

RELATED APPLICATIONS

This application is the U.S. National Stage of and claims priority to and the benefit of International Patent Application Number PCT/CN2013/073751, filed Apr. 3, 2013. The entire contents of the foregoing are hereby incorporated herein by reference for all purposes.

FIELD OF THE INVENTION

The present invention generally relates to enhanced repetition radio resource management RRM measurement mechanism in local area LA network with flexible time division duplex TDD. More particularly, the present invention addresses apparatus, method and computer program products, which ensure a more robust RRM measurement towarding neighboring cell measurement in a dense LA network with flexible TDD.

BACKGROUND

Mobile data transmission and data services are constantly making progress, wherein such services provide various communication services, such as voice, video, packet data, messaging, broadcast, etc. Such systems may be systems for multiple-access, which are capable of supporting multiple users by sharing the available system resources. In recent years, Long Term Evolution LTE™ and Long Term Evolution Advanced LTE™-A have been specified.

For time division duplex TDD deployments in Long Term Evolution LTE™ Release 11 or earlier release, same frame timing and same uplink-downlink configuration are deployed practically in the entire network. This is to avoid interference between uplink UL and downlink DL including both base station-to-base station and user equipment UE-to-UE interference. However, in a local area LA network, it may be of interest to consider different UL/DL allocations in the neighboring cells, since same DL/UL configuration may not match the traffic situation in different LA cells with a small number of users. Further, it is also desirable to make the DL-UL configuration more dynamic to adapt to the traffic status in each cell.

Due to such motivation, in document [1], it has been proposed to enable TDD UL-DL reconfiguration to adapt to the traffic variation, then improve the resource efficiency, power saving or traffic delay. Further, four different time scales for TDD DL-UL reconfiguration had been mentioned in document [2], and different time scales provide different gain from traffic adaptation. Though potential gain from the TDD DL-UL reconfiguration can be expected, it also brings some problems to be solved, which include:

Signaling mechanism(s) for TDD UL-DL reconfiguration;
HARQ timing in case of DL-UL reconfiguration;
DL-UL interference handling.

Then some enhancements may be necessary to solve the above solutions to make common understanding between eNB and UEs.

In particular, for the potential interference mitigation scheme, including both the scheduling dependent interference mitigation and interference mitigation based on enhanced inter-cell interference coordination/further enhanced inter-cell interference coordination eICIC/FeICIC schemes, it is mentioned the following specification impact is expected. Additional base station eNB measurements may need to be possible, where the purpose of the eNB measurements is to estimate the interference level from/to another eNB. In addition, necessary signaling and/or procedures related to the eNB measurements could be supported. Additional UE measurements may also be needed, where the purpose of the UE measurement is to estimate the interference level from another eNB or UE.

So far, in heterogeneous network deployment, enhanced inter-cell interference coordination eICIC in time domain is effective in improving the system and cell-edge throughput. With eICIC, a macro cell utilizes almost blank subframes ABS (cf. document [1]) with zero transmission power mainly in physical downlink control channel/physical downlink shared channel PDCCH/PDSCH to mitigate the interference to the pico user equipments UEs with cell range expansion CRE. This has been discussed e.g. in documents [4-5].

In particular, one neighboring measurement subset is defined for the RRM measurement, which is a subset of allocated ABS subframes. Moreover, there has been extensive discussion on cell-specific reference signal CRS interference handling in ABS based time domain eICIC solution, and the "needed information" (cf. documents [4-5]) is explored, to fulfill the successful neighboring cell measurements.

Hence, there is the need to provide enhanced repetition RRM measurement mechanism in LA network with flexible TDD, and in particular a more robust RRM measurement towarding neighboring cell measurement in a dense LA network with flexible TDD.

REFERENCES

[1] 3GPP RP-121722
[2] 3GPP TR 36.828
[3] 3GPP specification 36.331
[4] 3GPP R1-121901. "LS on feICIC", RAN1#68bis
[5] 3GPP R1-106551, "LS on CSI measurements on restricted subframes for eICIC"

SUMMARY OF THE INVENTION

It is an object of the present invention to address the above-mentioned drawbacks. In particular, it is an object of the present invention to provide an apparatus, a method and a computer program product for enabling enhanced radio resource management measurement mechanism in local area network with flexible time division duplex.

According to a first aspect of the present invention, a method comprises the steps of causing transmission, in a host cell, of information indicating a radio resource management measurement subband and a cross link measurement subframe to a user equipment approaching a neighboring cell and not performing an uplink transmission, for initiating a radio resource management measurement accomplished by the user equipment, wherein the radio resource management measurement subband is an uplink prohibited subband that is being used in a downlink transmission of the neighboring cell, and the cross link measurement subframe is a subframe capable of being used for completing an uplink to downlink switch.

According to a second aspect of the present invention, an apparatus comprises at least one processor and at least one memory including computer program code, the at least one memory and the computer program code configured to, with the at least one processor, cause the apparatus at least to perform causing transmission, in a host cell, of information indicating a radio resource management measurement subband and a cross link measurement subframe to a user equipment approaching a neighboring cell and not performing an uplink transmission, for initiating a radio resource management measurement accomplished by the user equipment, wherein the radio resource management measurement subband is an uplink prohibited subband that is being used in a downlink transmission of the neighboring cell, and the cross link measurement subframe is a subframe capable of being used for completing an uplink to downlink switch.

According to a third aspect of the present invention, a method comprises the steps of receiving, when approaching a neighboring cell and not performing an uplink transmission, information indicating a radio resource management measurement subband and a cross link measurement subframe from a base station of a host cell, wherein the radio resource management measurement subband is an uplink prohibited subband that is being used in a downlink transmission of the neighboring cell, and the cross link measurement subframe is a subframe capable of being used for completing an uplink to downlink switch, performing radio resource management measurement of the neighboring cell using the radio resource management measurement subband and the cross link measurement subframe, and causing transmission of information indicating the result of the radio resource management measurement to the base station of the host cell.

According to a fourth aspect of the present invention, an apparatus comprises at least one processor, and at least one memory including computer program code, the at least one memory and the computer program code configured to, with the at least one processor, cause the apparatus at least to perform receiving, when approaching a neighboring cell and not performing an uplink transmission, information indicating a radio resource management measurement subband and a cross link measurement subframe from a base station of a host cell, wherein the radio resource management measurement subband is an uplink prohibited subband that is being used in a downlink transmission of the neighboring cell, and the cross link measurement subframe is a subframe capable of being used for completing an uplink to downlink switch, performing radio resource management measurement of the neighboring cell using the radio resource management measurement subband and the cross link measurement subframe, and causing transmission of information indicating the result of the radio resource management measurement to the base station of the host cell.

According to a fifth aspect of the present invention, there is provided a computer program product comprising computer-executable components which, when the program is run on a computer, are configured to carry out the method according to the first aspect and/or the method according to the third aspect.

According to a sixth aspect of the present invention, an apparatus, comprises processing means for causing transmission, in a host cell, of information indicating a radio resource management measurement subband and a cross link measurement subframe to a user equipment approaching a neighboring cell and not performing an uplink transmission, for initiating a radio resource management measurement accomplished by the user equipment, wherein the radio resource management measurement subband is an uplink prohibited subband that is being used in a downlink transmission of the neighboring cell, and the cross link measurement subframe is a subframe capable of being used for completing an uplink to downlink switch.

According to a seventh aspect of the present invention, an apparatus comprises reception means for receiving, when approaching a neighboring cell and not performing an uplink transmission, information indicating a radio resource management measurement subband and a cross link measurement subframe from a base station of a host cell, wherein the radio resource management measurement subband is an uplink prohibited subband that is being used in a downlink transmission of the neighboring cell, and the cross link measurement subframe is a subframe capable of being used for completing an uplink to downlink switch, processing means for performing radio resource management measurement of the neighboring cell using the radio resource management measurement subband and the cross link measurement subframe, and transmission means for transmitting information indicating the result of the radio resource management measurement to the base station of the host cell.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which:

FIG. 1 shows a principle flowchart of an example for a method according to certain embodiments of the present invention;

FIG. 5 shows an example for TDD configuration 0.

DESCRIPTION OF EXEMPLARY EMBODIMENTS

Figure 2:
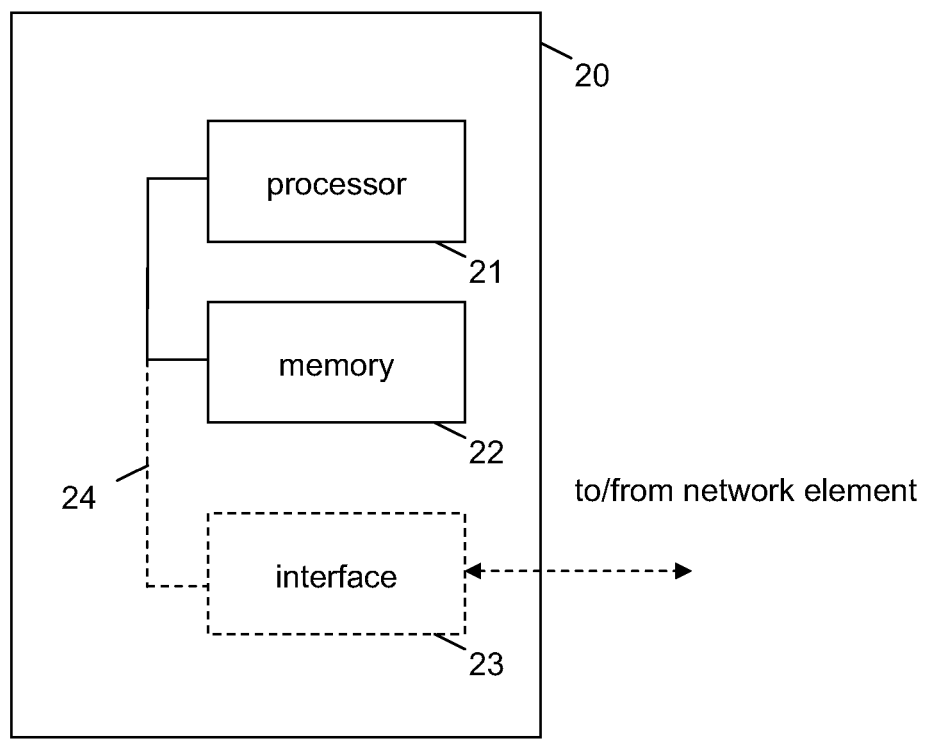
FIG. 2 shows a principle configuration of an example for an apparatus according to certain embodiments of the present invention.

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE™/LTE™-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Generally, when the TDD configuration is set as time configuration mode 0, since there is the limitation to try to avoid setting subframe 0,1,5,6 as ABS for the purpose of eliminating physical broadcast channel PBCH etc. interference, it is hard to find a ABS to protect the transmission at small cell.

Even though it is proposed in Rel-11 on how to do PBCH/PSS/SSS interference cancellation, perfect interference cancellation is always difficult for these subframes. Besides, for all the time configuration modes (especially TDD configuration 0), there always exists the resource restriction to both catering for the macro cell DL transmission and allocating ABS for pico cell transmission protection. All these addressed factors makes the ABS resource quite precious and hence limit macro UE RRM measurement of this pico cell.

Actually, with flexible TDD enabled, quite a lot of UL subframe at macro eNB could be designed as DL subframe at small cell. As the Release R8/R9/R10/R11 UE with different cell range expansion CRE bias when accessing the small cell, there will be quite large legacy UE deep into the small cell coverage but can not be served by small cell.

When these UEs are communicating with macro eNB in UL, the small cell UE will suffer from strong interference, which requires at least the transmission from the macro UE in UL and reception from the small cell UE in DL should be separated in frequency subband. This offers a good chance for a macro UE approaching small cell to accomplish the RRM measurement and discover the small cell in a reasonable way.

Therefore, according to certain embodiments of the present invention, a RRM measurement solution is proposed for the macro UE to accomplish the small cell discovery and finish the effective handover. It means that a macro UE that is approaching the pico cell is informed the DL tx subband in pico cell. When these UEs are not transmitting in UL at macro cell, they may overhear the DL tx of reference signal at pico cell. If they can do the RRM measurement in this informed subband, they can measure effectively free from the interference from the main aggressor cell (i.e., macro cell) without need to set any specific DL protected resource at aggressor cell. The proposal may enhance the robustness of RRM measurement with more measurement subframe/samples available Therefore, according to the present invention, a RRM measurement solution for the macro UE to accomplish the small cell discovery and finish the effective handover is provided.

In order to explain the present invention, a non-limiting scenario comprising a LA network with macro cell plus co-channel small cells (e.g., pico cell) and flexible TDD enabled is provided.

According to certain embodiments of the present invention, some UEs approaching the neighboring cell, e.g., a victim cell, measure the victim cell reference signal receiving power RSRP to accomplish the RRM measurement in a serving aggressor cell UL subframe, when they are not scheduled in these UL subframes. The detailed signalings are designed to accomplish it.

Thereby, the aggressor cell eNB signals this resource scheduling information to the aggressor cell UEs that are approaching the victim cell while without UL transmission in the flexible TDD subframe, for the purpose of RRM measurement towards these victim cells.

According to certain embodiments, the signaled information includes the RRM measurement subband, e.g., the UL transmission prohibited subband that is being used in DL transmission of victim cell, which can be free from the interference of the uplink interfering source.

This subband may be preferred for the RRM measurement purpose, since it is in UL transmission subframe at aggressor cell while without the actual transmission, which may eliminate the cell-specific reference signal CRS interference issue.

Furthermore, according to certain embodiments, the signaled information also includes the applied subframe, termed as cross link measurement subframe, so that the informed UE know which subframe to finish the uplink UL to downlink DL switch.

In this regard, the consecutive UL subframe before a DL subframe may be preferred, since it will reduce the additional incurred UL to DL switching gap.

Moreover, this signaling can be contained in dedicated signaling to the specific UE that are supposed for a small cell discovery based on proximity indication etc.

According to certain embodiments of the present invention, the informed aggressor cell UE measures the neighboring victim cell in the informed resource, which is a subband RRM measurement.

This measurement is free from the CRS interference, and hence, according to certain embodiments, there is no need to apply the CRS interference rule for this measurement in the related subframe.

According to certain embodiments, this measurement is also time domain restricted, said that it utilizes only part of the symbols in a whole subframe or some continuous subframes for measurement, which could make it free from the restriction of the required symbols for DL to UL switching.

Thereby, according to certain embodiments, the measured symbols are informed by the aggressor cell eNB, or depend on UE implementation.

FIG. 1 shows a principle flowchart of an example for a method according to certain embodiments of the present invention.

In Step S11, transmission is caused, in a host cell, of information indicating a radio resource management measurement subband and a cross link measurement subframe to a user equipment approaching a neighboring cell and not performing an uplink transmission, for initiating a radio resource management measurement accomplished by the user equipment, wherein the radio resource management measurement subband is an uplink prohibited subband that is being used in a downlink transmission of the neighboring cell, and the cross link measurement subframe is a subframe capable of being used for completing an uplink to downlink switch.

FIG. 2 shows a principle configuration of an example for an apparatus according to certain embodiments of the present invention. The apparatus 20 comprises at least one processor 21 and at least one memory 42 including computer program code, which are connected by a bus 24 or the like.

As indicated with a dashed line in FIG. 2, an interface 23 may optionally be connected to the bus 24 or the like, which may enable communication e.g. to/from a network entity, such as a UE, a vehicle gateway or the like. The at least one memory and the computer program code are arranged to, with the at least one processor, cause the apparatus at least to perform causing transmission, in a host cell, of information indicating a radio resource management measurement subband and a cross link measurement subframe to a user equipment approaching a neighboring cell and not performing an uplink transmission, for initiating a radio resource management measurement accomplished by the user equipment, wherein the radio resource management measurement subband is an uplink prohibited subband that is being used in a downlink transmission of the neighboring cell, and the cross link measurement subframe is a subframe capable of being used for completing an uplink to downlink switch.

Figure 3:
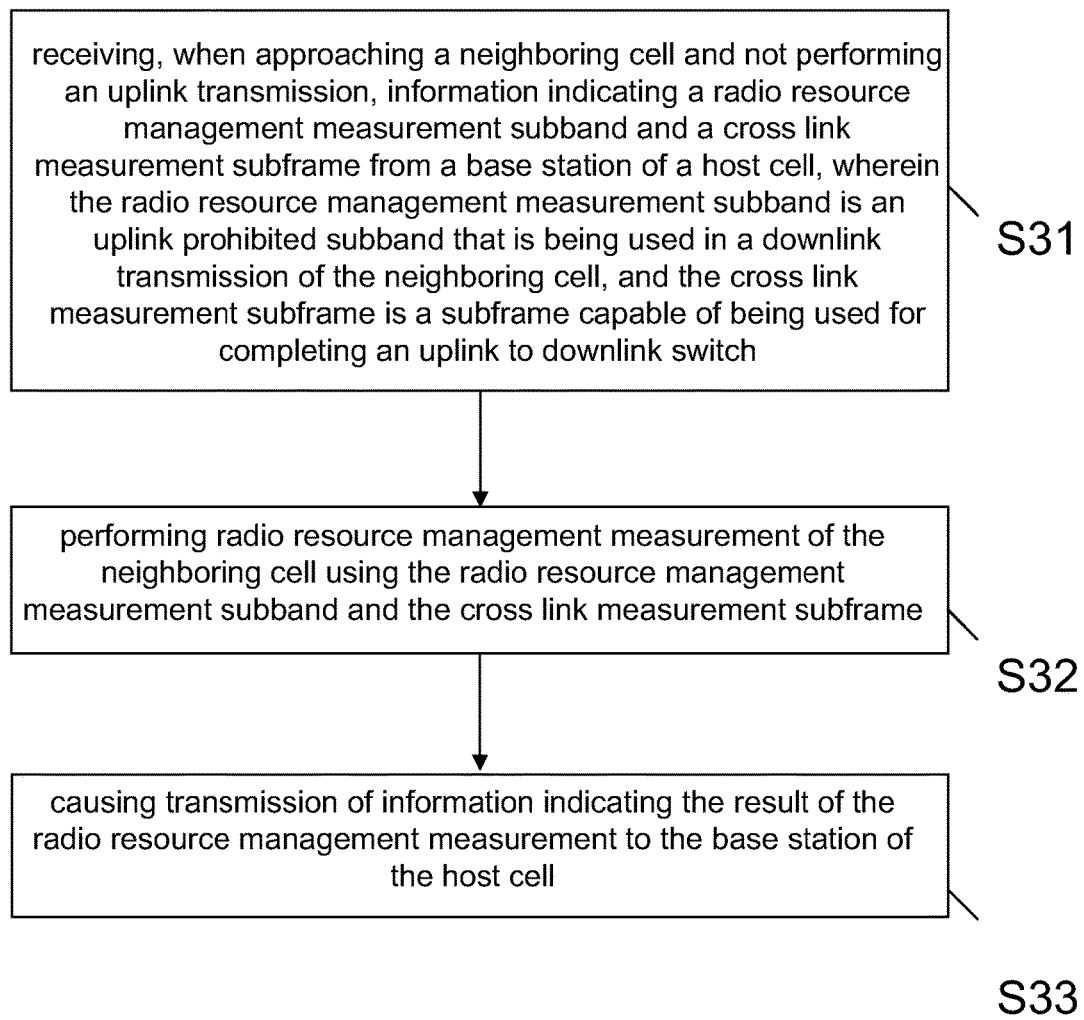
FIG. 3 shows a principle flowchart of an example for a method according to certain embodiments of the present invention.

FIG. 3 shows a principle flowchart of an example for a method according to certain embodiments of the present invention.

In Step S31, when approaching a neighboring cell and not performing an uplink transmission, information indicating a radio resource management measurement subband and a cross link measurement subframe is received from a base station of a host cell, wherein the radio resource management measurement subband is an uplink prohibited subband that is being used in a downlink transmission of the neighboring cell, and the cross link measurement subframe is a subframe capable of being used for completing an uplink to downlink switch.

In Step S32, radio resource management measurement of the neighboring cell is performed using the radio resource management measurement subband and the cross link measurement subframe.

In Step S33, transmission of information indicating the result of the radio resource management measurement to the base station of the host cell is caused.

Figure 4:
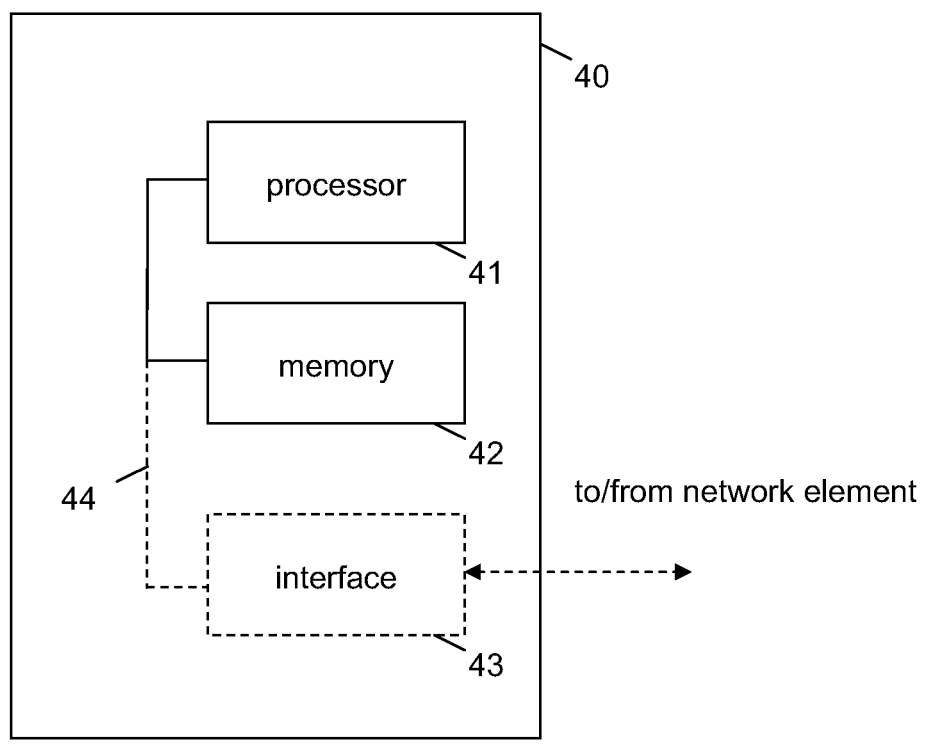
FIG. 4 shows a principle configuration of an example for an apparatus according to certain embodiments of the present invention.

FIG. 4 shows a principle configuration of an example for an apparatus according to certain embodiments of the present invention. The apparatus 40 comprises at least one processor 41 and at least one memory 42 including computer program code, which are connected by a bus 44 or the like. As indicated with a dashed line in FIG. 4, an interface 43 may optionally be connected to the bus 44 or the like, which may enable communication e.g. to/from a user equipment, a network entity, a base station, or the like. The at least one memory and the computer program code are arranged to, with the at least one processor, cause the apparatus at least to perform receiving, when approaching a neighboring cell and not performing an uplink transmission, information indicating a radio resource management measurement subband and a cross link measurement subframe from a base station of a host cell, wherein the radio resource management measurement subband is an uplink prohibited subband that is being used in a downlink transmission of the neighboring cell, and the cross link measurement subframe is a subframe capable of being used for completing an uplink to downlink switch, performing radio resource management measurement of the neighboring cell using the radio resource management measurement subband and the cross link measurement subframe, and causing transmission of information indicating the result of the radio resource management measurement to the base station of the host cell.

According to certain embodiments of the present invention, the cross link measurement subframe is the consecutive uplink subframe before a downlink subframe.

According to certain embodiments of the present invention, the radio resource management measurement is a subband radio resource management measurement.

According to certain embodiments of the present invention, the measurement in the related subframe is performed without applying a cell-specific reference signal interference rule.

According to certain embodiments of the present invention, the measurement is time domain restricted. In particular, the measurement utilizes only part of the symbols in a whole subframe or some continuous subframes for measurement, which could make it free from the restriction of the required symbols for downlink DL to uplink UL switching All the mentioned embodiments can be formed in several alternatives as illustrated but not limited to the implementation examples shown below.

According to certain embodiments of the present invention, the victim cell coordinates the resource scheduling information with the aggressor cell in some subframes for avoiding the strong interference suffered in victim cell DL when the uplink interfering source in the aggressor cell are in UL transmission in the same subframes.

This could be in terms of subband separation rather than specific physical resource block PRB indication in some subframes for reducing the control overhead incurred due to scheduling information exchange over inter-eNB interface.

According to certain embodiments, the aggressor cell signals the related RRM measurement subband and cross link measurement subframe for the certain UE, for the purpose of the accurate and robust RRM measurement.

Further, the informed UEs utilize this information to accomplish the clean RRM measurement and report correspondingly to its serving cell, e.g., macro cell, after filtering.

FIG. 5 schematically shows an example for TDD configuration 0.

There are following cases. According to case 1, if there is no scheduling for some UEs that need measurement in Subframe 3, then such signaling for crosslink subframe measurement apply to subframe 3. This case needs some DL→UL switching gap.

According to case 2, if there is no scheduling for some UEs that need measurement in Subframe 4, then such signaling for crosslink subframe measurement apply to subframe 4. This case does not need any gap since it follows the DL in the next subframe according to TDD configuration mode.

Furthermore, according to case 3, if there is no scheduling for some UEs that need measurement in Subframe 3 and 4, then such signaling for crosslink subframe measurement apply to subframe 3 and 4. This case does not need any gap since it also follows the DL in the next subframe according to TDD configuration mode.

In the upper mentioned cases, case 2 and 3 are preferred application since no DL→UL switching gap is required, which makes it more feasible. Likewise it applies to the subframe (9) or (8 and 9). But in case that time domain restricted measurement is allowed, case 1 is also a feasible solution.

An example according to certain embodiments of the present invention is shown as follows in the MeasObjectEUTRA information element IE and the corresponding MeasObjectEUTRA field descriptions based on 36.331 (i.e. document [3]), wherein amendments are indicated in bold italic letters.

The IE MeasObjectEUTRA specifies information applicable for intra-frequency or inter-frequency E-UTRA cells.

| MeasObjectEUTRA information element |
| --- |

```
-- ASN1START
MeasObjectEUTRA ::=            SEQUENCE {
    carrierFreq                     ARFCN-ValueEUTRA,
    allowedMeasBandwidth            AllowedMeasBandwidth,
    presenceAntennaPort1            PresenceAntennaPort1,
    neighCellConfig                 NeighCellConfig,
    offsetFreq                      Q-OffsetRange             DEFAULT dB0,
    -- Cell list
    cellsToRemoveList               CellIndexList             OPTIONAL,     -- Need ON
    cellsToAddModList               CellsToAddModList         OPTIONAL,     -- Need ON
    -- Black list
    blackCellsToRemoveList          CellIndexList             OPTIONAL,     -- Need ON
    blackCellsToAddModList          BlackCellsToAddModList    OPTIONAL,     -- Need ON
    cellForWhichToReportCGI         PhysCellId                OPTIONAL,     -- Need ON
    ...,
    [[measCycleSCell-r10            MeasCycleSCell-r10        OPTIONAL,     -- Need ON
      *measSubframePatternConfigNeigh-r10*     MeasSubframePatternConfigNeigh-r10
                          OPTIONAL      -- Need ON
    ]]
    *[[CrosslinkRRMMeasurementInformation-r12*        *NeighCellMeasurableResourceInfo-r12*
      *OPTIONAL    --Cond FlexibleTDDFeICIC*
    *]]*
}
CellsToAddModList ::=          SEQUENCE (SIZE (1..maxCellMeas)) OF CellsToAddMod
CellsToAddMod ::=     SEQUENCE {
    cellIndex                       INTEGER (1..maxCellMeas),
    physCellId                      PhyCellId,
    cellIndividualOffset            Q-OffsetRange
}
BlackCellsToAddList ::=        SEQUENCE (SIZE (1..maxCellMeas)) OF BlackCellsToAddMod
BlackCellsToAddMod ::=    SEQUENCE {
    cellIndex                       INTEGER (1..maxCellMeas),
    physCellIdRange                 PhysCellIdRange
}
MeasCycleSCell-r10 ::=         ENUMERATED (sf160, sf256, sf320, sf512,
                                            sf640, sf1024, sf1280, spare1)
MeasSubframePatternConfigNeigh-r10 ::=      CHOICE {
    release                         NULL,
    setup                           SEQUENCE {
        measSubframePatternNeigh-r10    MeasSubframePattern-r10,
        measSubframeCellList-r10        MeasSubframeCellList-r10    OPTIONAL
        -- Cond measSubframe
    }
}
MeasSubframeCellList-r10 ::=   SEQUENCE (SIZE (1..maxCellMeas)) OF PhysCellIdRange
*NeighCellMeasurableResourceInfo-r12 ::=SEQUENCE ( SIZE ( 1.. maxCellIntra )) OF*
*NeighCellMeasurableResourceConfig*
*NeighCellMeasurableResourceConfig ::=SEQUENCE {*
    *physCellId-r11*                   *PhysCellId,*
    *CrosslinkMeasurementSubframe*     *Subset of flexible subframes;*
    *CrosslinkMeasurementSubband*      *Subset of the available PRBs;*
*}*
-- ASN1STOP
```

| MeasObjectEUTRA field descriptions |
| --- |
| blackCellsToAddMoList |
| List of cells to add/modify in the black list of cells. |
| blackCellsToRemoveList |
| List of cells to remove from the black list of cells. |
| carrierFreq |
| Identifies E-UTRA carrier frequency for which this configuration is valid. |
| cellIndex |
| Entry index in the cell list. An entry may concern a range of cells, in which case this value applies to the entire range. |
| cellIndividualOffset |
| Cell individual offset applicable to a specific cell. Value dB-24 corresponds to −24 dB, dB-22 corresponds |

| MeasObjectEUTRA field descriptions |
|---|
| to −22 dB and so on. |
| cellsToAddModList |
| List of cells to add/modify in the cell list. |
| cellsToRemoveList |
| List of cells to remove from the cell list. |
| crsAggressorInformation |
| Information about cells for which UE can apply receiver-based techniques when feICIC is configured. |
| measCycleSCell |
| Parameter: $T_{measure\_scc}$ See TS 36.133 [16, 8.3.3]. The parameter is used only when an SCell is configured on the frequency indicated by the measObject and is in deactivated state, but the field may also be signalled when an SCell is not configured. Value sf160 corresponds to 160 sub-frames, sf256 corresponds to 256 sub-frames and so on. |
| measSubframeCellList |
| List of cells for which measSubframePatternNeigh is applied. |
| measSubframePatternNeigh |
| Time domain measurement resource restriction pattern applicable to neighbour cell RSRP and RSRQ measurements on the carrier frequency indicated by carrierFreq. For cells in measSubframeCellList the UE shall assume that the subframes indicated by measSubframePatternNeigh are non-MBSFN subframes. |
| NeighCellMeasurableResourceInfo-R12 |
| Information about a neighbor cell measurable resource configuration. The UE can use this information to measure the indicated neighbor cells (free from the CRS interference cancellation required knowledge) for RRM measurements using measurement resource restriction configured by, CrosslinkMeasurementSubframe and CrosslinkMeasurementSubband. |
| offsetFreq |
| Offset value applicable to the carrier frequency. Value dB-24 corresponds to −24 dB, dB-22 corresponds to −22 dB and so on. |
| physCellId |
| Physical cell identity of a cell in the cell list. |
| physCellIdRange |
| Physical cell identity or a range of physical cell identities of cells in the black list. |

| Conditional presence | Explanation |
|---|---|
| measSubframe | The field is mandatory present if measSubframePatternNeigh is configured. |
| feICIC | The field is mandatory present if measSubframePatternPcell, measSubframePatternNeigh or csi-SubframeSet2 is configured. |
| FlexibleTDDFeICIC | The field is mandatory present if flexible TDD and measurement resource insufficiency indication is configured. Measurement resource insufficiency indication is configured when more robust measurement is expected when flexible TDD is enabled. |

According to a further example according to certain embodiments of the present invention the restricted measurement subband part is added in the measSubframePatternConfigNeigh-r10.

With more flexible TDD subframes enabled in the small cell side, there is quite large number of UL subframes at macro cell configured as DL subframes at victim cell. With large traffic load, it is always difficult to get a good balance for a macro eNB to allocate the appropriate number of ABS while maintain the local data throughput in DL. Consequently, with less ABS configured, there is restricted measurement towards the victim cell RRM. The proposed enhancement may improve the RRM measurement robustness effectively by taking advantage of the resource coordination for the interference avoidance that is incurred due to the typical uplink interfering source in macro cell, and facilitate to reduce the relying on protected resource allocation.

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under LTE, LTE-A, WCDMA, WIMAX and WLAN and can advantageously be implemented in user equipments or smart phones, or personal computers connectable to such networks. That is, it can be implemented as/in chipsets to connected devices, and/or modems thereof.

According to the present invention, user equipment may refer to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:

| 3GPP | 3rd Generation Partnership Project |
| --- | --- |
| DL | Downlink |
| UL | Uplink |
| eNB | Enhanced Node B. |
| UE | User Equipment |
| Tx | Transmit |
| Rx | Receive |
| LTE | Long Term Evolution |
| PDCCH | Physical Downlink Control Channel |
| PDSCH | Physical Downlink Shared Channel |
| eICIC | Enhanced Inter-Cell Interference Coordination |
| FeICIC | Further Enhanced Inter-Cell Interference Coordination |
| RSRP | Reference Signal Receiving Power |
| CRE | Cell Range Expansion |
| ABS | Almost Blank Subframe |
| RRH | Remote Radio Head |
| CRS | Cell-specific Reference Signal |
| RRC | Radio Resource Control |
| CC | Component Carrier |
| CSI | Channel State Information |
| MCS | Modulation&Coding Scheme |
| RRM | Radio Resource Management |

What is claimed is:

1. A method, comprising
causing transmission, in a host cell, of information indicating a radio resource management measurement subband and a cross link measurement subframe, to a user equipment approaching a neighboring cell and not performing an uplink transmission, the transmission of the information for initiating a radio resource management measurement accomplished by the user equipment,
wherein the radio resource management measurement subband is an uplink prohibited subband that is being used in a downlink transmission of the neighboring cell, and the cross link measurement subframe is a subframe capable of being used for completing an uplink to downlink switch.

2. The method according to claim 1, wherein
the cross link measurement subframe is the consecutive uplink subframe before a downlink subframe.

3. The method according to claim 1, wherein
the transmission is targeted to a user equipment that is for a small cell discovery based on proximity indication and/or radio resource management measurement.

4. The method according to claim 1, wherein
the radio resource management measurement is at least one of a subband radio resource management measurement, a physical resource block indication, and an indication of some physical resource blocks.

5. The method according to claim 4, wherein
the measurement in the related subframe is performed without applying a cell-specific reference signal interference rule.

6. The method according to claim 4, wherein
the measurement is time domain restricted, wherein only part of the symbols in a whole subframe or some continuous subframes is used for measurement.

7. The method according to any of claim 1, wherein the method is carried out in a base station.

8. The method according to any of claim 1, wherein the method is carried out in a Long Term Evolution or Long Term Evolution Advanced network architecture.

9. An apparatus comprising
at least one processor; and
at least one memory including computer program code;
the at least one memory and the computer program code configured to, with the at least one processor, cause the apparatus at least to
cause transmission, in a host cell, of information indicating a radio resource management measurement subband and a cross link measurement subframe, to a user equipment approaching a neighboring cell and not performing an uplink transmission, the transmission of the information for initiating a radio resource management measurement accomplished by the user equipment,
wherein the radio resource management measurement subband is an uplink prohibited subband that is being used in a downlink transmission of the neighboring cell, and the cross link measurement subframe is a subframe capable of being used for completing an uplink to downlink switch.

10. The apparatus according to claim 9, wherein the cross link measurement subframe is the consecutive uplink subframe before a downlink subframe.

11. The apparatus according to claim 9, wherein the transmission is targeted to a user equipment that is supposed for a small cell discovery based on proximity indication and/or RRM measurement.

12. The apparatus according to claim 9, wherein the radio resource management measurement is at least one of a subband radio resource management measurement, a physical resource block indication, and an indication of some physical resource blocks.

13. The apparatus according to claim 12, wherein the measurement in the related subframe is performed without applying a cell-specific reference signal interference rule.

14. The apparatus according to claim 12, wherein the measurement is time domain restricted, wherein only part of the symbols in a whole subframe or some continuous subframes is used for measurement.

15. The apparatus according to claim 9, wherein the apparatus is a base station.

16. The apparatus according to claim 9, wherein the apparatus is part of a Long Term Evolution or Long Term Evolution Advanced network architecture.

17. An apparatus comprising
at least one processor; and
at least one memory including computer program code;
the at least one memory and the computer program code configured to, with the at least one processor, cause the apparatus at least to
receive, when approaching a neighboring cell and not performing an uplink transmission, information indicating a radio resource management measurement subband and a cross link measurement subframe from a base station of a host cell, wherein the radio resource management measurement subband is an uplink prohibited subband that is being used in a downlink transmission of the neighboring cell, and the cross link measurement subframe is a subframe capable of being used for completing an uplink to downlink switch;
perform radio resource management measurement of the neighboring cell using the radio resource management measurement subband and the cross link measurement subframe; and
cause transmission of information indicating the result of the radio resource management measurement to the base station of the host cell.

18. The apparatus according to claim 17, wherein the cross link measurement subframe is the consecutive uplink subframe before a downlink subframe.

19. The apparatus according to claim 17, wherein the radio resource management measurement is a subband radio resource management measurement.

20. The apparatus according to claim 17, wherein the measurement in the related subframe is performed without applying a cell-specific reference signal interference rule.

* * * * *